United States Patent [19]

Schindler et al.

[11] Patent Number: 4,512,250

[45] Date of Patent: Apr. 23, 1985

[54] APPARATUS FOR COOKING EGGS

[75] Inventors: James C. Schindler; Donald K. Jewell, both of Naperville, Ill.

[73] Assignee: Restaurant Technology, Inc., Oak Brook, Ill.

[21] Appl. No.: 316,102

[22] Filed: Oct. 28, 1981

Related U.S. Application Data

[62] Division of Ser. No. 146,438, May 5, 1980, abandoned.

[51] Int. Cl.³ .............................................. A47J 37/10
[52] U.S. Cl. ........................................ 99/425; 99/339; 99/345; 99/426; 99/448; 99/467; 126/20; 426/523; 426/614
[58] Field of Search ............... 426/511, 523, 614, 510; 99/339, 340, 345, 347, 440, 422, 425, 426, 352, 428, 330, 467, 474, 448; 219/401; 126/20, 369

[56] References Cited

U.S. PATENT DOCUMENTS

| | | | |
|---|---|---|---|
| 162,041 | 2/1851 | Klein . | |
| 323,887 | 8/1885 | Rutter | 99/426 X |
| 2,481,711 | 9/1949 | Bemis | 99/345 X |
| 2,719,211 | 9/1955 | Lewis et al. | 99/467 X |
| 2,766,126 | 10/1956 | Hawk | 426/614 |
| 2,824,510 | 2/1958 | Gangwer | 99/440 X |
| 2,999,024 | 9/1961 | Stimpson et al. | 426/614 |
| 3,071,473 | 1/1963 | Churley | 126/20 X |
| 3,113,872 | 12/1963 | Jones et al. | 426/511 |
| 3,248,221 | 4/1966 | Shulz et al. | 426/510 X |
| 3,320,945 | 5/1967 | Dunkelman | 126/369 |
| 3,500,818 | 3/1970 | Elias | 99/467 |
| 3,624,230 | 11/1971 | Robinson | 426/510 X |
| 3,639,725 | 2/1972 | Maniscalco | 99/330 X |
| 3,704,663 | 12/1972 | Shull et al. | 99/347 |
| 3,733,998 | 5/1973 | Vischer | 99/330 |
| 3,735,749 | 5/1973 | Binks | 99/474 X |
| 3,753,737 | 8/1973 | Latham et al. | 426/523 |
| 3,951,131 | 4/1976 | Houfek | 99/330 X |
| 3,958,035 | 5/1976 | Stearns et al. | 426/614 |
| 3,992,984 | 11/1976 | Treiber | 426/511 X |
| 4,068,570 | 1/1978 | Lanoie | 99/353 |
| 4,119,021 | 10/1978 | Moses | 99/425 |
| 4,228,193 | 10/1980 | Schindler et al. | 426/614 X |

FOREIGN PATENT DOCUMENTS 225741 9/1910 Fed. Rep. of Germany ........ 99/428

OTHER PUBLICATIONS

"6 Pak Egg Ring" Publication by Prince Castle Inc., Oct. 13, 1976.

Primary Examiner—Billy J. Wilhite
Attorney, Agent, or Firm—Dressler, Goldsmith, Shore, Sutker & Milnamow, Ltd.

[57] ABSTRACT

A method and apparatus for cooking an egg is disclosed wherein a grill surface is provided for supporting an egg thereon and wherein a steam containment enclosure is provided to cover the grill surface. A shelled egg is placed on the grill surface under the steam containment enclosure. The grill surface is heated by, and steam is injected within the steam containment enclosure from, a single source of pressurized steam whereby at least the bottom portion of the egg is grilled or fried with an upper portion of the egg being simultaneously basted with steam.

11 Claims, 7 Drawing Figures

APPARATUS FOR COOKING EGGS

This is a division of application Ser. No. 146,438, filed May 5, 1980, now abandoned.

DESCRIPTION

1. Technical Field

This invention relates to the cooking of one or more shelled eggs.

2. Background of the Invention

Various processes and apparatus have been used to mix, treat, fry, poach, and baste eggs. The characteristics of the resulting egg product vary from process to process and can be affected by the specific apparatus that is used for carrying out the process.

The product produced in accordance with the present invention is a highly desirable cooked egg product that is especially suitable for use in a sandwich product. In the preferred form, the egg product is formed from one shelled egg, has a generally disc-like configuration with the yolk broken and mixed with a portion of the egg white, and is cooked by the combination of low temperature grilling of the egg bottom and vertical side surfaces and simultaneous basting of the top surface of the egg with steam.

It has been found that this product is not as undesirably dense as eggs cooked with some other methods and is more moist and easy to digest than eggs cooked with some other methods.

It has been found that the egg product made in accordance with the teachings of the invention described herein can be produced with a relatively short cooking time and can be very conveniently produced from a number of eggs simultaneously. The product is thus eminently suitable for high volume food preparation applications, including fast food restaurants and the like.

The egg product produced in accordance with the teachings of the present invention can be prepared quickly, efficiently, and under sanitary conditions with a minimum amount of operator labor and attention. Further, within these constraints, it has been found that the egg product is easily prepared to a consistently uniform quality, which quality can be easily controlled.

The cooked egg product described herein can be produced in a manner that eliminates most operator error and in a manner that eliminates inconsistencies in the cooked product owing to individual operator performance or lack of performance.

As discussed in more detail hereinafter, the above-described highly desirable egg product is cooked in an apparatus by a method wherein an egg grilling surface is provided that is substantially flat and free of depressions or cavities so as to aid in the establishment of a substantially uniform heat flux and permit the surface to be easily and rapidly cleaned. Further, the method is preferably effected with an apparatus in which heat and moisture is conveniently introduced from one source by means of one heat transfer agent. The cooking heat is transferred to the various surfaces of the eggs with a substantially uniform heat flux and in a manner that permits easy regulation of the temperature to reduce the probability of scorching.

Although various types of apparatus have been devised for frying and steaming eggs in various ways, the nature of the resulting cooked egg products, the methods of cooking the products, and the various apparatus for effecting those methods are unlike those of the present invention and are not particularly well suited for the highly automated, high volume product preparation conditions existent in fast food restaurants and the like for which the present invention is especially well suited.

For example, steam cookers, typically having a pressure vessel, are known for use with various types of food as disclosed in the U.S. Pat. Nos. 3,071,473, 3,248,221, 3,733,998 and 3,951,131.

The production of small pieces of eggs which are blended and cooked with steam is disclosed in the U.S. Pat. No. 4,068,570. A method for treating shelled eggs with steam to remove objectionable flavor characteristics is disclosed in U.S. Pat. No. 3,113,872.

Methods and apparatus for producing egg yolk products or scrambled eggs with injected steam are disclosed in U.S. Pat. Nos. 2,766,126, 2,999,024, and 3,624,230.

An apparatus for cooking two eggs at a time and which has a housing holding liquid water and containing valves for emitting drops of water onto heated griddle areas which are not occupied by the eggs is disclosed in the U.S. Pat. No. 2,481,711.

Apparatus for producing omelet type egg products by means of in-pan grilling, and/or steam injection are disclosed in the U.S. Pat. Nos. 3,753,737 and 3,958,035.

However, none of the apparatus disclosed in the above-discussed patents produces the highly desirable egg product according to the novel method effected by the novel apparatus described herein.

SUMMARY OF THE INVENTION

A preferred method of cooking an egg disclosed in detail herein includes the steps of first providing a flat grill surface for supporting an egg thereon and providing a steam containment enclosure adapted to cover the egg on the grill surface. The grill surface is heated, before the egg is placed on the grill surface, or alternatively, at the same time as, or after, the egg has been placed on the grill surface.

Next, while the egg is being heated on the grill surface, steam is injected, from a source of pressurized steam, within the steam containment enclosure whereby at least a bottom portion of the egg is fried on the grill surface with an upper portion of the egg being simultaneously basted by the steam.

In a preferred embodiment of the apparatus for effecting the above-described method, a grill is provided on top of a steam chamber by means of which the grill is heated. An assembly comprising a plurality of egg retaining rings is pivotably mounted to the housing and adapted to be moved between an elevated position off of the grill surface and a lowered position on top of the grill surface. Each ring is adapted to receive a shelled egg therein.

Also pivotably mounted to the housing is a steam containment enclosure. The enclosure preferably has a plurality of cavities that are each adapted to be positioned over an associated egg retaining ring on the grill surface when the steam containment enclosure is lowered over the grill surface.

The steam containment enclosure cavities are preferably connected by steam flow passageways in the enclosure to one or more steam inlets opening downwardly toward the grill surface. Steam injection nozzles project upwardly from the grill surface and communicate with these openings. Steam is injected from these nozzles in a timed, on-off cycle into the openings, through the steam flow passages, and into the cavities over the eggs.

In another embodiment, egg retaining rings are provided with a taper or draft to permit the rings to be easily raised away from the cooked eggs. The rings are provided in an assembly along with the steam containment enclosure and a hinge mounting member adapted to be mounted or placed on a conventional grill.

Numerous advantages and features of the present invention will become readily apparent from the following detailed description of the invention and of embodiments thereof, from the claims and from the drawings.

BRIEF DESCRIPTION OF THE DRAWINGS

In the accompanying drawings forming part of the specification and in which like numerals are employed to designate like parts throughout the same.

DESCRIPTION OF THE PREFERRED EMBODIMENT

While this invention is susceptible of embodiment in many different forms, there are shown in the drawings and will herein be described in detail preferred embodiments and process parameters. It should be understood, however, that the present disclosure is to be considered as an exemplification of the principles of the invention and is not intended to limit the invention to the embodiments illustrated or to the process parameter values listed.

The precise shapes and sizes of the components herein described are not essential to the invention unless otherwise indicated.

Figure 1:
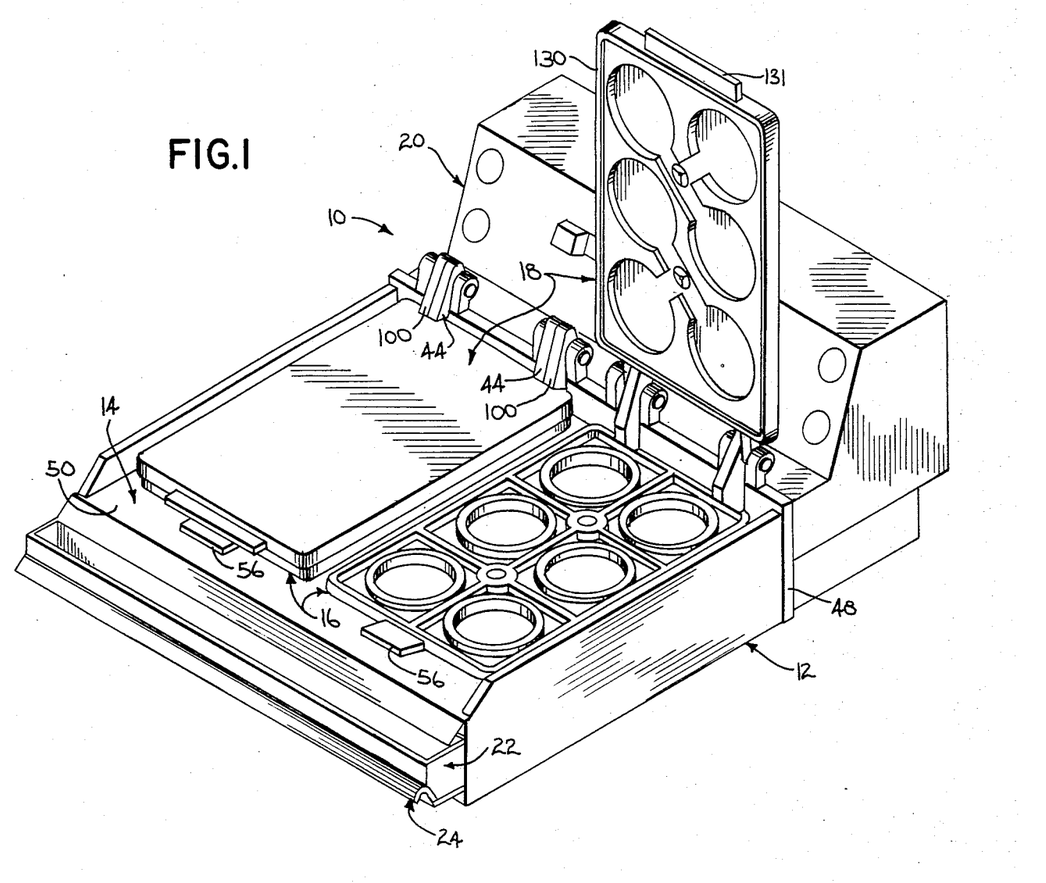
FIG. 1 is a perspective view of the apparatus disclosed herein for cooking eggs with the right-hand side steam containment enclosure cover in the raised position off of the grill surface to expose the egg retaining wall assembly on the grill surface and with the left-hand side steam containment enclosure cover in the lowered position on the grill surface.

A preferred embodiment of an apparatus for cooking eggs is illustrated in FIG. 1 and is designated therein generally by the reference numeral 10. In the embodiment illustrated, the apparatus 10 is adapted to be placed on a counter or table of a restaurant kitchen or of an institutional kitchen for use in preparing from one to twelve cooked eggs. However, it is to be realized that the apparatus may be modified for use in other environments, such as in the home, wherein the apparatus could have the capability of simultaneously cooking a reduced number of eggs, say from one to four.

Further, it is to be realized that the apparatus 10 may be provided as a component for being mounted in a counter assembly or in a movable food cooking or preparing cart. In such cases, certain cosmetic exterior panels and enclosures illustrated in FIG. 1 may be eliminated if desired.

In any case, the apparatus 10 includes a housing 12, a grill member 14 at the top of the housing 12 and defining a generally flat grill surface 50, a pair of side-by-side egg retaining wall assemblies 16, a pair of side-by-side steam containment enclosure covers 18, and a control panel 20.

The front of the housing 12 is provided with a trough 22 supported in a holder 24 below the grill surface 50 for receiving liquids that may run off of the front of the grill surface during the cooking of the eggs. Further, the trough 22 also receives particulate and liquid matter that may be scraped from the grill surface 50 from time to time when the apparatus 10 is cleaned. The trough 22 may be slid from either open end of the holder 24 when it is desired to remove the trough 22 and empty the contents therefrom.

When eggs are to be cooked with the apparatus 10, one or more eggs are first shelled and placed upon the grill member 14 so that they are retained by the egg retaining assembly 16 in a manner that will next be explained in detail. Specifically, with reference to FIG. 5, each egg retaining assembly 16 comprises six cylindrical rings or egg retaining walls 30 which are arranged in a two by three rectangular array and maintained in that orientation by means of a carrier 32.

Figure 6:
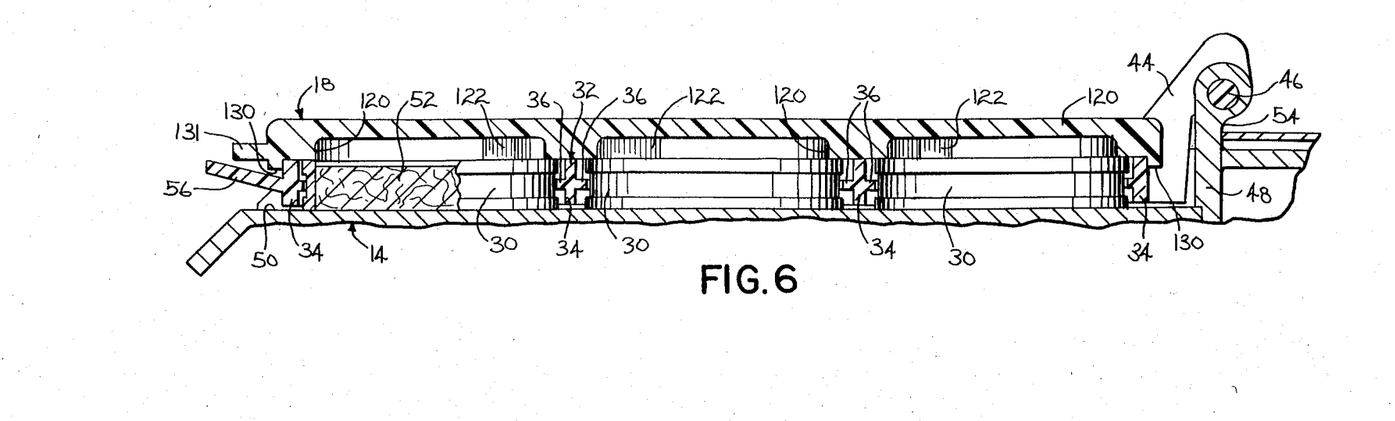
FIG. 6, on the sheet of drawings with FIG. 4, is an enlarged, fragmentary, partial cross-sectional view taken generally along the planes 6—6 in FIG. 5.

The carrier 32, as best illustrated in FIG. 6, has a grid-like frame 34 which defines six substantially square regions with each region containing one of the rings 30. The carrier 32 also includes a web 36, formed integrally with the frame 34, and which, within each square region around a ring 30, defines a generally circular aperture 38 (FIG. 7 only) surrounding a ring 30.

Figure 7:
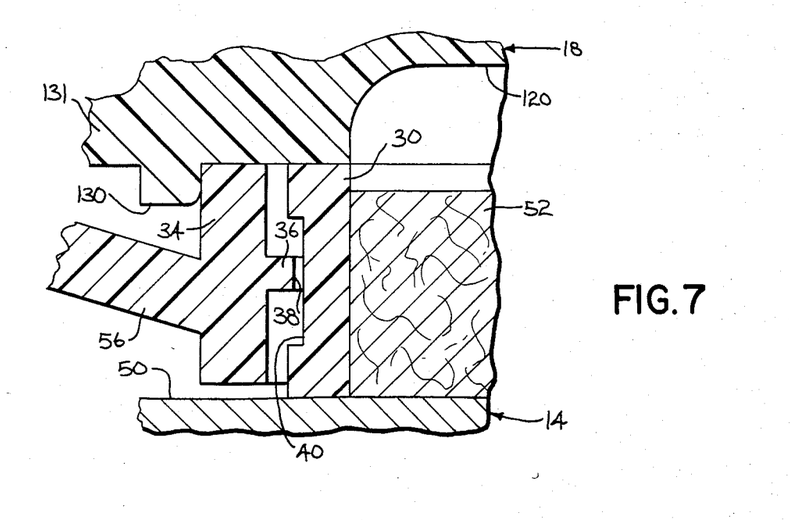
FIG. 7, on the sheet of drawings with FIG. 1, is a greatly enlarged, fragmentary, cross-sectional view of the left-hand end of the apparatus illustrated in FIG. 6.

As best illustrated in FIG. 7, the exterior circumferential surface of each ring 30 has an annular groove or channel 40. The diameter of the groove 40 is somewhat less than the diameter of the aperture 38 of the egg retaining assembly carrier 32. This provides an annular space around each ring 30 that permits each ring 30 to move freely relative to the carrier 32 horizontally and also vertically along the longitudinal axis of the ring to the extent permitted by the width of the groove 40 and the thickness of the carrier web 36.

This capability for relative movement between the rings 30 and carrier 32 permits each ring 30 to "float" relative to the carrier 32 and to become properly seated on the surface 50 of the grill member 14. Thus, if the surface 50 of the grill member 14 is not uniformly flat across its entire length and width, the egg retaining rings 30 will each independently and separately be more fully supported on the grill surface 50 than if the rings 30 were rigidly connected together. This independent seating of each ring 30 on the grill surface 50 permits each ring 30 to provide a more complete seal between the ring 30 and the grill surface 50 with respect to an egg, designated generally by reference numeral 52 in FIG. 7, contained therein.

Figure 4:
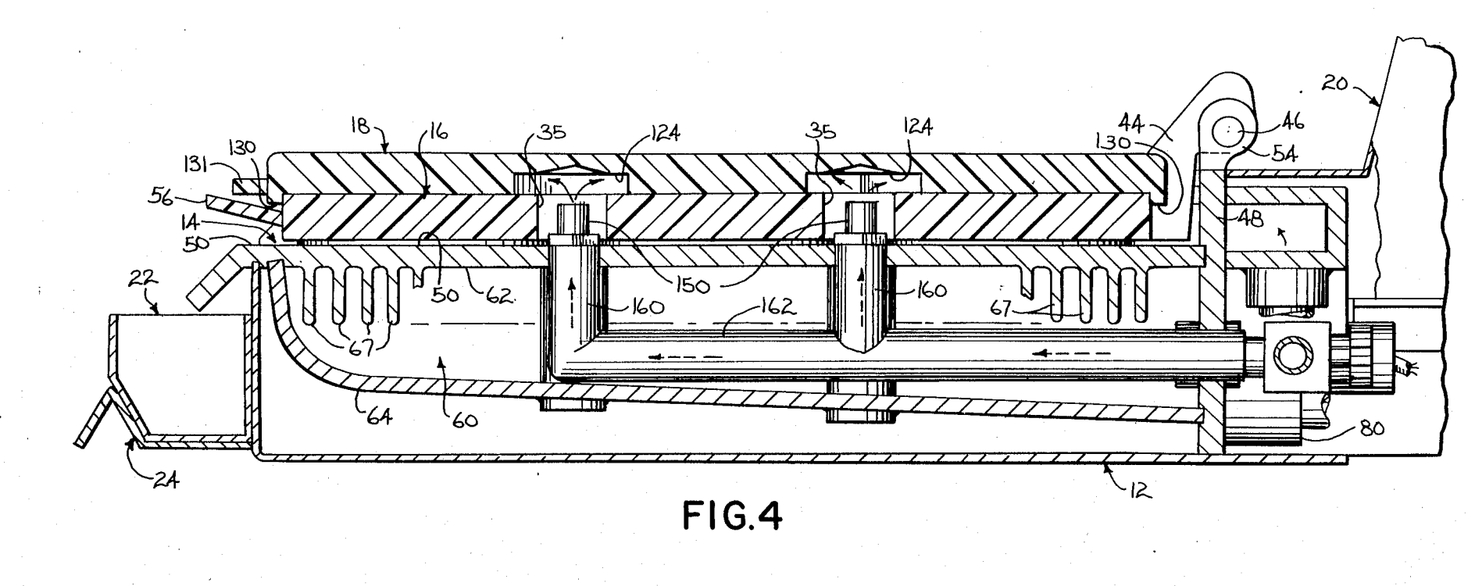
FIG. 4 is an enlarged, fragmentary, partial, cross-sectional view taken generally along the planes 4—4 in FIG. 2.
Figure 5:
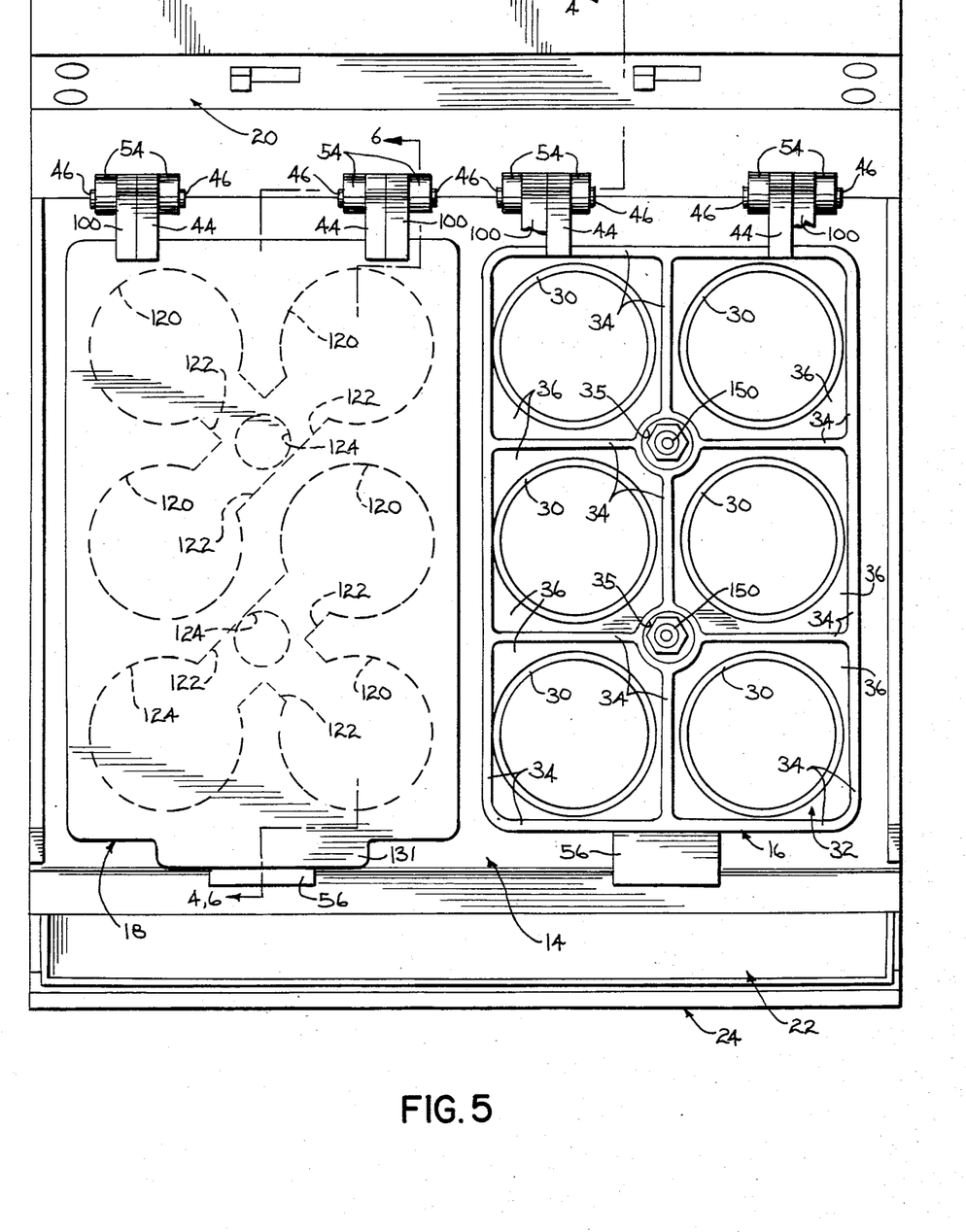
FIG. 5 is an enlarged, fragmentary plan view of the apparatus in FIG. 1 with the right-hand side steam containment enclosure cover cut away to better illustrate the underlying portions.

As best illustrated in FIGS. 4 and 5, the frame 34 of the egg retaining wall assembly 16 defines two apertures 35 which are each adapted to receive therein an upwardly projecting steam injection nozzle 150. The structure and purpose of the steam injection nozzles will be described hereinafter in more detail. Insofar as the nozzles 150 relate to the egg retainer wall assembly 16, it is sufficient to note here that the nozzles 150 are mounted in, and project upwardly from, the grill member 14.

Preferably, the egg retaining wall assembly 16, including the rings 30, is fabricated from a thermoplastic material, such as a high density polyethylene. The relative diameters of the rings 30 and of the surrounding carrier web apertures 38 are preferably selected so as to, among other things, permit the rings 30 to be easily inserted and removed from the carrier web 36. This accommodates ease of assembly during fabrication and also accommodates disassembly subsequent to fabrication during cleaning of the apparatus 10 after each use.

As best illustrated in FIGS. 1, 5, and 6, the egg retaining assembly 16 is pivotably mounted to the housing 12 by means of a pair of rearwardly projecting lugs 44 which are mounted to, and pivot about, axially aligned pins 46. Each pin 46 is supported on a rear wall 48 of the housing 12 by means of a pair of spaced-apart mounting brackets 54. Thus, each egg retaining assembly 16 may be pivoted upwardly away from the grill member 14, after the eggs have been cooked, to permit the cooked eggs to be removed from the grill surface 50 and also to permit the grill surface 50 to be cleaned. To aid in lifting the egg retaining wall assembly 16 upwardly, a tab or handle 56 is provided at the front of the assembly 16 as best illustrated in FIGS. 1 and 4.

The eggs are cooked, in part, by means of grilling or frying the bottom surfaces of the eggs. This is achieved by transferring heat through the grill member 14 on which the eggs are supported. The structure and mechanism for effecting the heating of the grill member 14 will next be described in detail with reference to FIGS. 2, 3, and 4.

As best illustrated in FIG. 4, the housing 12 includes a steam heating chamber 60 below the grill member 14. The steam heating chamber 60 is defined on the top by the heat exchange surface or bottom 62 of the grill member 14. The bottom portion of the steam heating chamber 60 is defined by a downwardly sloping plate 64 which is closed on either side by side members 66 (FIG. 2).

The heat exchange surface 62 on the underside of the grill member 14 is heated by steam, introduced by means to be described in detail hereinafter, and the heat is conducted from the heat exchange surface 62 through the grill member 14 to the grill surface 50. To promote increased heat transfer, a plurality of heat transfer fins 67 extend into the steam heating chamber 60 from the heat exchange surface 62 of the grill member 14. The fins 67 extend transversely across the bottom of the grill member 14 between the steam heating chamber side members 66 (FIG. 2).

Figure 2:
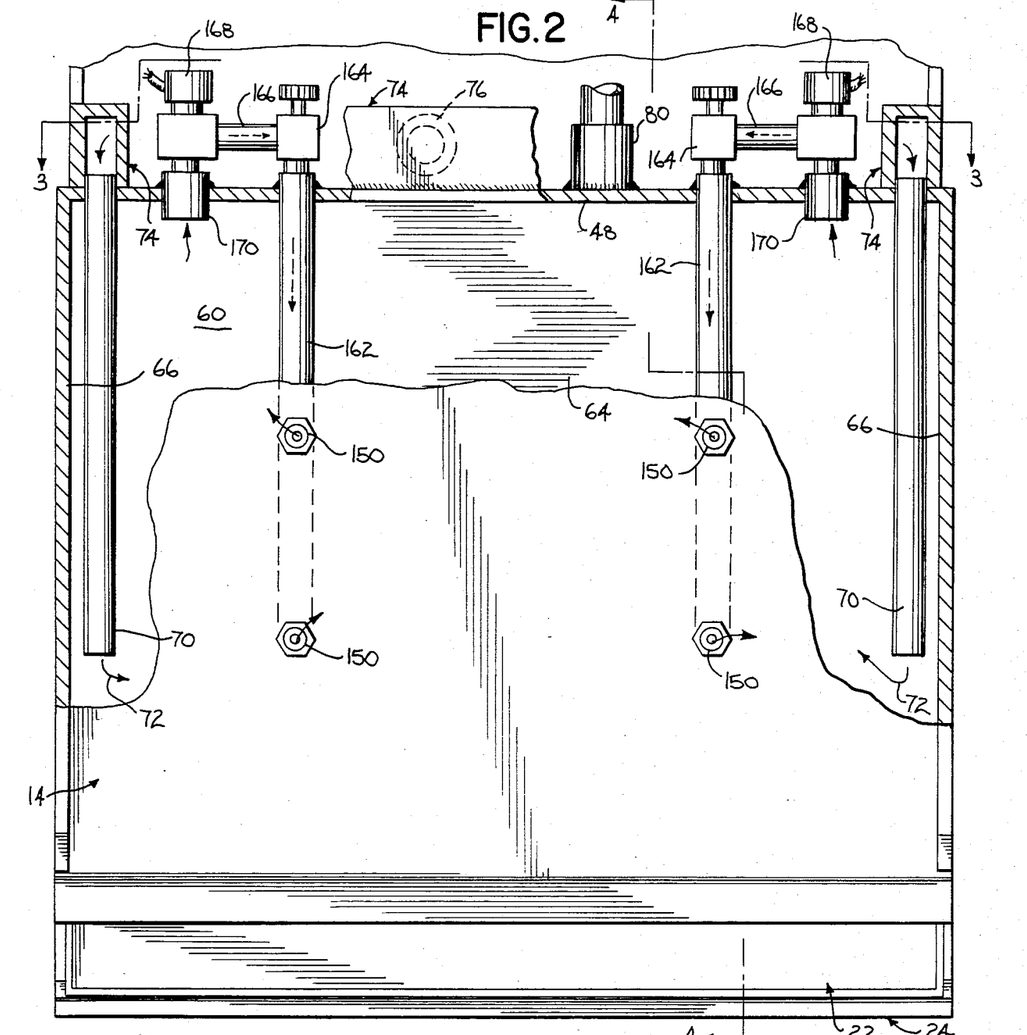
FIG. 2 is an enlarged, fragmentary, partial cross-sectional plan view of the apparatus of FIG. 1 with certain portions cut away to better illustrate interior details.

Steam is introduced directly into the steam heating chamber 60 by means of a pair of discharge conduits or pipes 70 located along the steam heating chamber side members 66 as best illustrated in FIG. 2. The steam is diagrammatically illustrated with arrows 72 as discharging from an end opening in each of the pipes 70.

Figure 3:
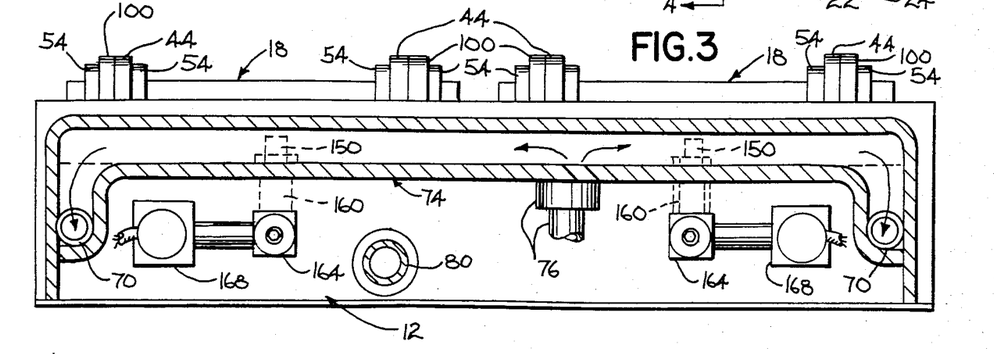
FIG. 3 is a fragmentary, cross-sectional view taken generally along the planes 3—3 in FIG. 2.

The steam is introduced into the pipes 70 at the rear of the apparatus 10 as best illustrated in FIGS. 2 and 3. Specifically, a steam supply manifold 74 is provided at the rear of the housing 12. The manifold 74 extends across the back of the housing 12 and receives steam, from a source of pressurized steam (not illustrated), through an inlet conduit assembly 76.

The steam is preferably supplied from a suitable boiler at a pressure in the range of between about 10 pounds per square inch gauge and about 15 pounds per square inch gauge at a temperature of above 200 degrees F., and preferably around 235 degrees F. If the apparatus 10 is incorporated as part of an assembly of a plurality of food preparation or cooking devices in which some of the other devices use steam, then a common boiler may be provided for simultaneously supplying steam to the apparatus 10 as well as to the other devices.

During the cooking of the eggs on the grill surface 50, steam transfers heat to the grill member 14 and some of that steam then condenses to water on the underside of the grill member 14. The formed condensate drops off of the fins 67 and off of the other surfaces of the grill member 14 within the steam heating chamber 60 and onto the steam heating chamber bottom plate 64. The bottom plate 64 is sloped downwardly towards the rear of the apparatus 10 to enable the condensate to flow by gravity to the rear of the apparatus where it is discharged through a conduit 80 as best illustrated in FIGS. 2, 3, and 4. The condensate is returned, by suitable conduit means not illustrated, to the boiler or to waste, as may be desired.

Although the grill member 14 is preferably heated with steam as described above, other heating means, such as electrical resistance heating, could be used.

Steam is also used to cook the upper portions of the eggs in the apparatus 10. To this end, a novel means is provided for introducing steam above the eggs and for containing the steam thereabove during the cooking period. Specifically, the steam containment enclosures or covers 18 are provided with a structure for receiving, directing, and containing the steam as necessary to cook the upper portions of the eggs. The steam containment enclosure structure will next be described in detail.

FIGS. 4, 5, and 6 best illustrate the structure of the steam containment enclosure 18. The enclosure 18 is pivotably mounted to the housing 12 at the rear of the grill member 14 about the same pins 46 previously described as providing the pivotable mounting of the egg retaining assemblies 16. To this end, each steam containment enclosure 18 includes a pair of rearwardly projecting lugs 100 in which are journaled the pins 46. The enclosures 18 may thus pivoted to the raised position illustrated for the enclosure 18 on the right-hand side of the apparatus 10 in FIG. 1 and may be pivoted downwardly on top of the grill member 14 as illustrated for the enclosure 18 on the left-hand side of the apparatus 10 in FIG. 1.

To enable the user of the apparatus 10 to conveniently lift the cover 18 to the raised position and to lower the cover 18 onto the grill surface 50, a tab or handle 131 is provided at the front of the cover 18 as best illustrated in FIGS. 1, 4, 5, and 6.

As best illustrated for the enclosure 18 on the left-hand side of the apparatus 10 in FIG. 5 and in the cross-sectional view of FIG. 6, the enclosure 18 has six steam cavities 120 which are each adapted to be positioned over an egg retaining ring 30. Specifically, each cavity 120 has a generally hollow cylindrical configuration and is positioned in registry with an egg retaining ring 30 below it when the enclosure 18 is in the lowered position on the grill member 14. As best illustrated for the ring 30 on the left end in FIG. 6, the interior diameter of the ring 30 is substantially identical to the interior diameter of the superposed steam cavity 120 in the enclosure 18.

The cavities 120 are arranged in two groups of three within each enclosure 18. The three cavities 120 in each group are connected by means of steam flow passageways 122 which join in a central intersection region 124 as best illustrated in FIGS. 4 and 5. When the enclosure 18 is in the lowered position, the central intersection regions 124 are positioned in alignment with, and over, the steam injection nozzles 150 (FIGS. 4 and 5).

Thus, it is seen that steam, supplied from the nozzles 150 by conduit means to be described in detail hereinafter, is able to pass upwardly from each nozzle 150 through the associated egg retainer wall assembly aperture 35 and into the central intersection region 124 of the passages 122. From there, the steam flows through each of the three passages 122 to the three cavities 120 associated with one of the nozzles 150. The steam is then trapped within each cavity 120 in a steam containment volume that is defined, in cooperation with the egg retaining wall assembly 16, above the egg 52.

To ensure proper registration of the steam containment enclosure cover 18 with the egg retaining wall assembly 16, the cover 18 is provided with a downwardly extending peripheral lip 130 as best illustrated in FIGS. 1, 4, and 7. The lip 130 also directs escaping air and steam downwardly along side of the apparatus 10. To eliminate the possibility of an undesirable pressure build up, the fit of the cover on the egg retainer wall assembly is designed to permit air to be discharged as the steam is first injected into the cover. Some small amount of steam may subsequently escape also.

The steam containment enclosure cover 18 is preferably fabricated from a polycarbonate polymer material. This type of material is preferable to other materials having a high thermal conductivity and heat capacity, such as metal, to reduce the amount of steam that condenses above the eggs on the cover 18. It is desired to have the steam preferentially condense on the eggs.

Steam is supplied to the steam nozzles 150 by a novel conduit and control system. Specifically, with reference to FIGS. 2, 3, and 4, each steam nozzle 150 is connected to a vertical conduit 160 which extends downwardly into the housing steam chamber 60 and which is connected to a steam supply conduit 162. There is one conduit 162 associated with, and generally centered below, each of the two steam containment enclosure covers 18.

Each steam supply conduit 162 extends out of the steam chamber through the rear wall 48, as best illustrated in FIG. 2, where it is connected to a needle valve 164 that may be adjusted to control the steam flow through the conduit 162. The inlet of the needle valve 164 is connected to a conduit 166 which is in turn connected to the outlet of an electrically operated two-way solenoid valve 168.

The inlet of the solenoid valve 168 is connected to a conduit 170 which extends through the steam chamber rear wall 48 and communicates with the interior of the steam chamber 60. Thus, when the solenoid valve 168 is actuated to open, steam from the steam chamber 60 can pass through the solenoid valve 168, through the needle valve 164, through the conduits 162 and 160, and out of the steam injection nozzles 150.

When eggs are to be cooked with the apparatus 10, the grill surface 50 is preferably initially buttered or coated with a suitable cooking oil. Steam is admitted into the steam chamber 60 from the boiler (not illustrated) to heat the grill member 14 and raise the temperature of the grill surface 50 to about 235 degrees F. Preferably, the grill surface is maintained at less than 265 degrees F.

Next, one shelled egg is placed in each of the rings 30 (though not all rings 30 need be used). Preferably, the yolk of the shelled egg in each ring 30 is broken, as by briefly stirring the shelled egg with a fork. Subsequently, the covers 18 are lowered over the egg retaining wall assemblies 16.

The control panel 20 is provided with a suitable, conventional microprocessor system, the details of which form no part of the present invention. By actuating a switch on the control panel 20, the cooking cycle is initiated. The cycle cooks the bottom portions of the eggs on the grill surface 50 for a period of five seconds before steam is injected.

The steam is injected, after the five second initial grilling period, at a pressure in the range of between 10 pounds per square inch gauge and about 15 pounds per square inch gauge at a temperature of about 235 degrees F. The steam flows to the injection nozzles 150 through the system of valves and conduits described above. The electrically operated solenoid valve 168 is actuated to open by a suitable signal from the microprocessor in the control system so that the steam from the steam chamber 60 can be injected into the cavities 120 from the eggs.

After the electrically operated solenoid valve 168 has remained open for five seconds, it is actuated by the control system microprocessor to close for five seconds and thus shut off the flow of steam to the steam injection nozzles 150 for five seconds. This alternating cycle of injecting steam for a period of five seconds and then terminating the injection of steam for a period of five seconds is performed over a total length of time for about 85 seconds in addition to the initial five second grilling of the eggs. At the end of 90 seconds from the start of the cooking cycle, the cooking is terminated by closing the electrically operated solenoid valve 168 a final time. The end of the cooking cycle may be indicated by a suitable visual and/or audio annunciator on the control panel 20.

When the eggs have been cooked, the covers 18 are lifted to the raised position by the operator. Next, the egg retaining wall assemblies 16 are lifted by the operator to the raised position to expose the cooked eggs on the grill surface 50. If necessary, each egg retaining wall assembly 16 may be manually pivoted up and down through a small angle of movement at a relatively rapid rate of oscillation for a few seconds to loosen any eggs that may stick to the egg rings 30 and to ensure that the eggs remain on the grill surface 50. The cooked eggs may then be removed with a spatula.

The grill surface 50 may be cleaned after each cooking cycle, if desired, by scraping the grill surface towards the front of the apparatus 10 so that the liquid and particulate matter remaining on the grill surface is pushed into the collection trough 22.

It is seen that the above described apparatus and method for producing cooked eggs produces a cooked egg product resulting from the combination of low temperature grilling of the bottom and side portions of a broken yolk egg and the simultaneous basting of the top surface of the egg with steam.

It has been found that eggs produced on the apparatus described herein and with the method described herein are easier to digest than eggs cooked by some other methods and are not as undesirably dense as eggs cooked by some other methods. This is especially true when the interior portion of the egg is cooked to a temperature of about 190 degrees F. in accordance with the method described herein.

Owing to the fact that the grill is heated with steam and can be controlled easily so that the temperature does not exceed about 235 degrees F., there is virtually no scorching of the cooked egg product.

With the method and apparatus described herein, eggs can be consistently cooked to the same uniform quality. It is believed that the uniformity of the cooked product and a desirable capability to repeatedly cook eggs having substantially identical cooked consistencies are due, in part, to the use of steam to heat the underside of the grill member 14 and to the use of the novel structure incorporated in the grill member 14. It is believed that a more uniform heat flux exists throughout the grill surface 50 than exists in conventional gas heated or electrical resistance heated grills.

It is to be further realized that with the steam heated grill of the apparatus disclosed herein, the steam flows to those portions of the underside of the grill member where it is needed. That is, if one egg is placed on a portion of the grill member, the sudden cooling effect of that egg on the grill member causes some of the steam to condense on the underside of the grill member below the egg. The surrounding steam them immediately flows into the area to continue to heat the grill under the egg. The grill is thus self-compensating in this respect.

It has been found that each egg ring 30 may be advantageously provided with a slight draft or taper on the inside diameter. Specifically, the inside of each egg ring may have a diameter at the bottom end (in contact with the grill surface) that is larger than the diameter at the top end of the ring. This frustoconical configuration will permit the egg ring to be more easily lifted away from the egg and will substantially prevent the egg from sticking to the egg ring. Thus, the eggs will remain on the grill surface when the egg retaining wall assembly is raised to the elevated position.

In another embodiment of the apparatus, the egg retaining wall assembly 16 and the steam containment enclosure cover 18 may be adapted for use on a conventional grill. To this end, the egg retaining wall assembly and steam containment enclosure cover would each be pivotably mounted in a suitable bracket on a heavy base or bar which can be placed at the rear portion of a conventional grill on the grill surface. The mounting bracket would preferably be U-shaped for receiving horizontal mounting pins projecting from the rear of the cover and egg retaining wall assembly and for permitting the cover and retaining wall assembly to be easily removed, if desired.

The steam containment enclosure would have one or more apertures (e.g., in the central intersection regions 124 illustrated in FIGS. 4 and 5) communicating with the exterior of the cover and adapted to receive an end or nozzle portion of a suitable flexible steam supply conduit. Pressurized steam would be supplied from a suitable source, through valves (e.g., similar to valves 164 and 168 illustrated in FIGS. 2 and 3 and described above) to the steam containment enclosure for cooking the eggs in the manner described above in detail. A control system, similar to that described above for the apparatus 10, could be used to automatically control the cooking sequence. Such a device would permit the cooking, on a conventional grill, of the desirable egg product in accordance with the teachings of the invention described herein.

From the foregoing, it will be observed that numerous variations and modifications may be effected without departing from the true spirit and scope of the novel concept of the invention. It is to be understood that no limitation with respect to specific apparatus and methods illustrated herein is intended or should be inferred. It is, of course, intended to cover by the appended claims all such modifications as fall within the scope of the claims.

What is claimed is:

1. Apparatus for cooking an egg comprising:
   (a) a grill having a grill surface for supporting an egg thereon, said grill including a grill member defining said grill surface on one side and also defining a heat exchange surface on the other side for being heated whereby heat can be transferred from said heat exchange surface through said grill member to said grill surface;
   (b) means for heating said grill surface from beneath the grill surface;
   (c) a steam containment enclosure adapted to cover said grill surface for defining a steam containment volume thereabove;
   (d) means for injecting steam above said grill surface from a source of pressurized steam into said steam containment volume;
   (e) said grill further including a steam heating chamber defined in part by said grill member;
   (f) wherein said apparatus further includes means for injecting steam into said steam heating chamber; and
   (g) a plurality of heat transfer fins extending into said steam heating chamber from said heat exchange surface of said grill member.

2. The apparatus in accordance with claim 1 further including a movable egg retaining wall assembly adapted to be disposed upon said grill surface and comprising a plurality of rings and a means for supporting each ring for independent movement relative to the others.

3. The apparatus in accordance with claim 1 in which said apparatus further includes a housing, in which said steam containment enclosure is pivotably secured to said housing, and in which said housing supports said grill surface.

4. The apparatus in accordance with claim 1 further including a trough-like collecting means disposed adjacent said grill surface for receiving matter removed from said grill surface.

5. The apparatus in accordance with claim 1 in which said steam injecting means comprises at least one steam injecting nozzle, conduit means connecting said source of pressurized steam with said steam injecting nozzle, a valve in said conduit means operable between (1) a closed position blocking flow of said steam to said steDam injecting nozzle and (2) an open position permitting flow of said steam to said steam injecting nozzle.

6. The apparatus in accordance with claim 1 in which said steam containment enclosure is fabricated from a polycarbonate polymer material.

7. Apparatus for cooking an egg comprising
   (a) a grill having a grill surface for supporting an egg thereon;
   (b) means for heating said grill surface from beneath the grill surface;

(c) a steam containment enclosure adapted to cover said grill surface for defining a steam containment volume thereabove;

(d) means for injecting steam above said grill surface from a source of pressurized steam into said steam containment volume; and wherein said steam injecting means includes at least one steam jet nozzle projecting upwardly from said grill surface and in which said steam containment enclosure includes at least one steam flow passageway adapted to be positioned over and communicating with said nozzle.

8. The apparatus in accordance with claim in which said steam containment enclosure includes a cavity communicating with said steam flow passageway and adapted to be positioned over a shelled egg on said grill surface.

9. Apparatus for cooking a plurality of eggs simultaneously comprising:

(a) a grill having a grill surface for supporting said eggs thereon in spaced-apart relationship and means for retaining each of said eggs separated from the others on said grill surface from the other eggs;

(b) means for heating said grill surface from beneath the grill surface;

(c) a steam containment enclosure adapted to cover said grill surface and having means for defining a plurality of separate steam containment cavities with each steam containment cavity associated with only one of the eggs to be cooked, said steam containment enclosure further defining at least one steam injection region displaced from said steam containment cavities, said steam containment enclosure further including passageways connecting said steam containment cavities with at least one of said steam injection regions; and (d) means for injecting steam into each said steam injection region from a source of pressurized steam.

10. The apparatus in accordance with claim 9 in which said means for retaining each of said eggs separated from the others on said grill surface includes a plurality of rings adapted to be disposed upon said grill surface.

11. The apparatus in accordance with claim 9 in which said apparatus includes two of said steam injection regions, in which said apparatus includes six said cavities, and in which each of said cavities is connected to one of said steam injection regions through one of said passageways.

* * * * *

UNITED STATES PATENT AND TRADEMARK OFFICE
CERTIFICATE OF CORRECTION

PATENT NO. : 4,512,250
DATED : April 23, 1985
INVENTOR(S) : James C. Schindler and Donald K. Jewell It is certified that error appears in the above-identified patent and that said Letters Patent is hereby corrected as shown below:

In column 8, at line 27, the word "from" should be -- above --.

In column 11, at line 13, the claim number is missing. It should be claim No. 7.

In column 10, at line 59, the word "ste-Dam" should be -- steam --.

Signed and Sealed this

Seventeenth Day of September 1985

[SEAL]

Attest:

DONALD J. QUIGG

Attesting Officer

Commissioner of Patents and
Trademarks—Designate